(12) United States Patent
Grosser et al.

(10) Patent No.: US 7,660,259 B1
(45) Date of Patent: Feb. 9, 2010

(54) METHODS AND SYSTEMS FOR HYBRID HARDWARE- AND SOFTWARE-BASE MEDIA ACCESS CONTROL (MAC) ADDRESS LEARNING

(75) Inventors: Donald B. Grosser, Apex, NC (US); Michael D. Mroz, Fuquay Varina, NC (US)

(73) Assignee: Extreme Networks, Inc., Santa Clara, CA (US)

(*) Notice: Subject to any disclaimer, the term of this patent is extended or adjusted under 35 U.S.C. 154(b) by 443 days.

(21) Appl. No.: 10/969,678

(22) Filed: Oct. 20, 2004

(51) Int. Cl.
*G01R 31/08* (2006.01)
*H04L 12/28* (2006.01)
*H04L 12/56* (2006.01)
*H04L 12/54* (2006.01)
*G06F 15/173* (2006.01)

(52) U.S. Cl. .................. 370/252; 370/389; 370/392; 370/429; 709/224; 709/226

(58) Field of Classification Search .................. 370/389, 370/392, 252, 253, 255
See application file for complete search history.

(56) References Cited

U.S. PATENT DOCUMENTS

| | | | | |
|---|---|---|---|---|
| 6,112,258 A | * | 8/2000 | Miller et al. | 710/19 |
| 6,996,615 B1 | * | 2/2006 | McGuire | 709/226 |
| 7,483,370 B1 | * | 1/2009 | Dayal et al. | 370/219 |
| 2002/0085507 A1 | * | 7/2002 | Ku et al. | 370/255 |
| 2002/0196796 A1 | * | 12/2002 | Ambe et al. | 370/401 |
| 2004/0174898 A1 | * | 9/2004 | Kadambi et al. | 370/463 |
| 2005/0125692 A1 | * | 6/2005 | Cox et al. | 713/201 |
| 2005/0141537 A1 | * | 6/2005 | Kumar et al. | 370/429 |
| 2006/0056412 A1 | * | 3/2006 | Page | 370/392 |

* cited by examiner

*Primary Examiner*—Chi H Pham
*Assistant Examiner*—Farah Faroul
(74) *Attorney, Agent, or Firm*—Jenkins, Wilson, Taylor & Hunt, P.A.

(57) ABSTRACT

Methods and systems for hybrid layer 2 address learning are disclosed. In one method, a packet with a layer 2 source address is received. Next, it is determined whether to implement hardware-based learning or software-based learning based on a classification of the received packet. In response to determining that software-based learning is required, the source address and corresponding forwarding information in the packet are learned using software. In response to determining that hardware-based learning is required, the source address and corresponding forwarding information are learned using hardware.

42 Claims, 5 Drawing Sheets

METHODS AND SYSTEMS FOR HYBRID HARDWARE- AND SOFTWARE-BASE MEDIA ACCESS CONTROL (MAC) ADDRESS LEARNING

TECHNICAL FIELD

The subject matter disclosed herein relates to methods and systems for MAC address learning. More particularly, the subject matter disclosed herein relates to methods and systems for hybrid MAC address learning using a combination of hardware MAC address learning and software MAC address learning.

BACKGROUND ART

Open systems interconnect (OSI) layer 2 forwarding devices, such as Ethernet switches, maintain one or more forwarding tables to provide destination information for forwarding layer 2 packets. A typical forwarding table includes a list of destination addresses and corresponding forwarding information. The forwarding information can include an output port or other information for forwarding a received packet to its destination. For example, when a packet is received at the forwarding device, the packet can be examined to determine its destination address. Next, a lookup is performed in the forwarding table to determine the forwarding information corresponding to the destination address. The packet can then be forwarded to the port corresponding to the destination address in the forwarding table.

Conventional layer 2 forwarding devices, such as media access control (MAC) forwarding devices, build forwarding tables by learning the ports associated with destination addresses. Address learning may include building a forwarding table by associating the source address of a received packet with the port of the forwarding device on which the packet is received. Subsequently received packets having a destination address matching the learned source address of the received packet can be forwarded to the corresponding port listed in the forwarding table. If a packet arrives and there is no entry in the forwarding table for the packet's destination address, the packet will be flooded to all output ports. Because such flooding wastes bandwidth, it is desirable to learn MAC addresses as quickly as possible.

Conventional layer 2 MAC learning systems build and maintain forwarding tables by utilizing either a software-based or hardware-based approach. One software-based approach includes identifying that MAC learning is required by the absence of an entry corresponding to the MAC source address in a received packet and forwarding the packet to a central processor for software-based learning. Next, the central processor may implement a security policy to determine whether MAC learning is allowed. If MAC learning is allowed, the central processor can add the MAC source address to the hardware forwarding table associated with the appropriate source port. Subsequent packets with the same source MAC address will not require MAC learning because the MAC address is stored in the forwarding table.

One hardware-based approach utilizes a hardware module for learning MAC addresses. In particular, the hardware module can recognize that MAC address learning is required for a given MAC address by searching the MAC forwarding table for an entry corresponding to a source MAC address. If the entry is not present, the hardware adds the entry to the forwarding table. A software-managed shadow table can be utilized for user interface applications, such as displaying the MAC address forwarding table. Software polling or an interrupt mechanism may drive the software-managed shadow table. However, software is not utilized for learning or building the forwarding table.

The software-based approach described above has the advantage of flexibility over the hardware-based approach. For example, MAC security features, such as limiting the number of learned MAC addresses for a given port, VLAN, or port/VLAN combination, preventing learning of MAC addresses that have not been expressly allowed by an administrator, or providing 802.1x security, can be readily implemented using the software-based approach. 802.1x refers to a port-based access control protocol where devices must be authenticated before being granted access to a LAN. Software MAC learning may be implemented such that MAC address learning is only permitted for MAC addresses that have been authenticated. Utilizing the software-based approach, specific MAC addresses can be dynamically prevented from accessing the network. However, one disadvantage of the software-based-approach is that the MAC address learn rate is limited by the availability of the system processor. This may result in a delay between receiving a given source MAC address and incorporating the MAC address into the hardware forwarding table. As discussed above, undesirable layer 2 flooding of packets can result until software-learning is complete. In addition, software-based learning increases the burden on the system processor that performs the learning.

The hardware-based approach can be advantageous over the software-based approach for a number of reasons. For example, new MAC addresses can be learned at line rate. Another advantage is that there is no unnecessary layer 2 flooding because there is negligible delay between receiving a packet requiring MAC source learning and adding the entry to the hardware forwarding table. Finally, performing hardware-based learning decreases the load on the processor, thus allowing other software modules additional processing time. One disadvantage of the hardware-based approach is the lack of flexibility. For example, while hardware can be designed to implement MAC security features, it cannot be updated to implement new security features unless the hardware is designed to allow such flexibility. Regardless of the flexibility of the initial hardware design, there will always be new features that existing hardware cannot implement. For such features, a hardware redesign will be required.

Accordingly, in light of these problems associated with software-based and hardware-based layer 2 address learning, there exists a long felt need for improved methods and systems for layer 2 address learning, such as MAC address learning.

SUMMARY

According to one aspect, the subject matter described herein includes methods and systems for hybrid hardware- and software-based MAC address learning. A method for hybrid MAC address learning can include receiving a packet including a source address at a forwarding device. The forwarding device may include software and hardware for learning the source address and forwarding information associated with the packet. The method also includes determining whether to implement hardware-based learning or software-based learning based on a classification of the received packet. If it is determined to implement software-based learning, the software of the forwarding device is utilized for learning the source address of the received packet and the forwarding information. If it is determined to implement hardware-based learning, the hardware of the forwarding device is utilized for learning the source address of the received packet and the forwarding information.

The methods and systems described herein can be implemented using hardware, software, firmware or any combination thereof. In one implementation, the methods and systems described herein may be implemented as a computer program product comprising computer-executable instructions embodied in a computer-readable medium. Exemplary computer-readable media suitable for implementing the methods and systems described herein include chip memory devices, disk storage devices, such as optical or magnetic discs, and downloadable electrical signals.

BRIEF DESCRIPTION OF THE DRAWINGS

Preferred embodiments of the subject matter described herein will now be explained with reference to the accompanying drawings of which.

DETAILED DESCRIPTION

Figure 1:
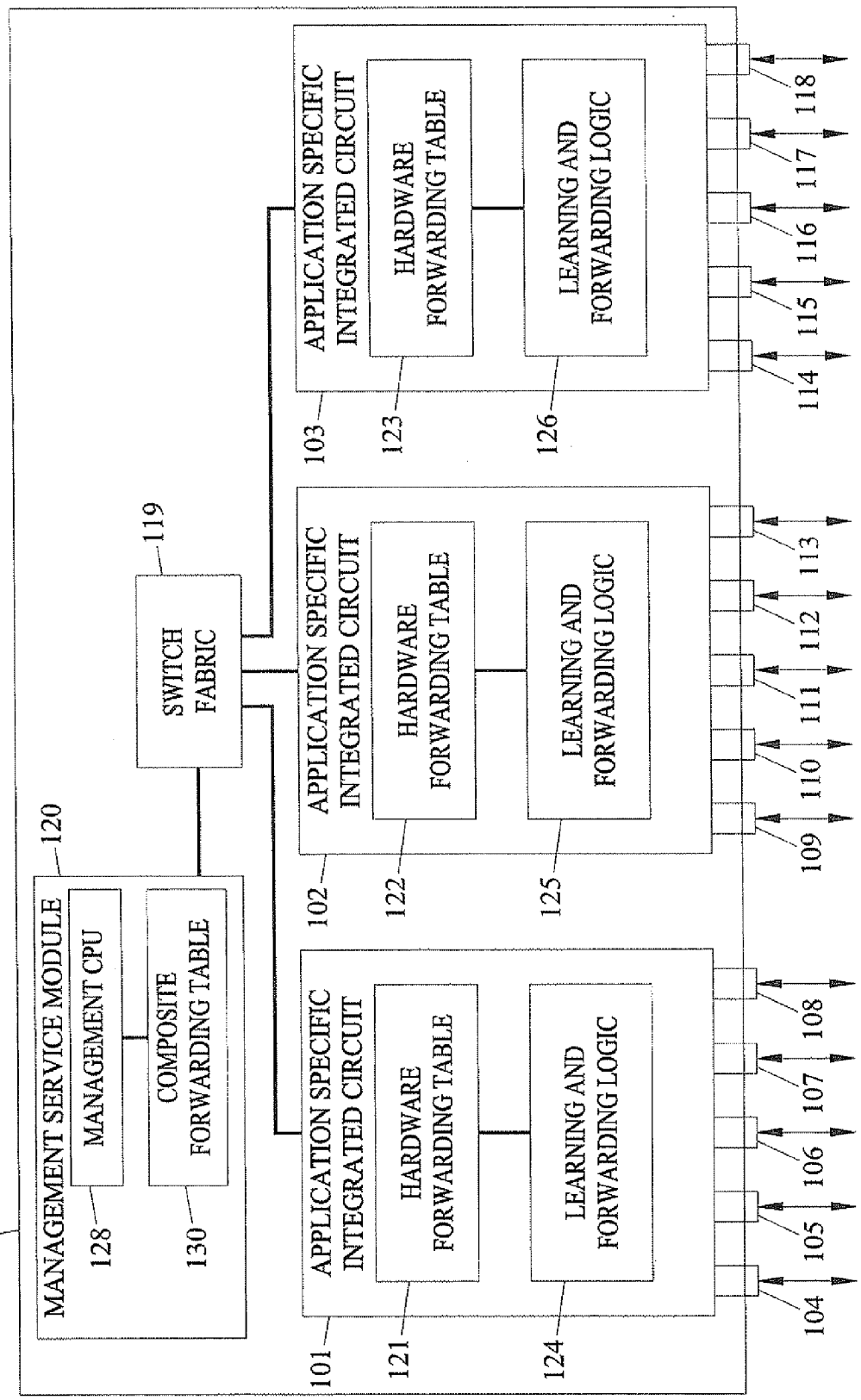
FIG. 1 is a block diagram illustrating exemplary components of a layer 2 forwarding device including hardware and software for implementing hybrid hardware- and software-based MAC address learning according to an embodiment of the subject matter described herein.

Methods and systems for hybrid hardware- and software-based media MAC address learning may be implemented in any suitable layer 2 forwarding device, such as an Ethernet switch. FIG. 1 illustrates exemplary components of a layer 2 forwarding device 100 including hardware and software for implementing hybrid hardware- and software-based MAC address learning according to an embodiment of the subject matter described herein. Forwarding device 100 may be implemented on any suitable underlying layer 1 and 2 platform. An exemplary switch including an underlying hardware and software platform suitable for use with embodiments described herein is the Aspen™ or other suitable Ethernet switch available from Extreme Networks of Santa Clara, Calif.

In the illustrated example, layer 2 forwarding device 100 includes a plurality of input/output modules 101-103 having ports 104-118 for sending and receiving layer 2 packets over a network. Input/output modules 101-103 may each be implemented as printed circuit boards plugged into slots in forwarding device 100. A switch fabric 119 connects input/output modules 101-103 to each other and to a management switching module (MSM) 120. Switch fabric 119 may be any suitable type of switching fabric, such as a cross-bar switch.

Forwarding device 100 includes hardware and software for implementing both hardware-based and software-based MAC address learning and for determining whether to implement hardware- or software-based learning. The determination of whether to perform hardware-based or software-based learning can be based upon a classification of a received packet as described further herein. In one implementation, each port of forwarding device 100 may default to hardware-based learning. Hardware-based learning can be set as a default in order to minimize unnecessary layer 2 flooding and minimize CPU usage for increased performance and scalability. When MAC security features requiring greater layer 2 learning flexibility are enabled, software-based learning can be enabled on ports where such features are required.

Hardware-based learning can be implemented using learning and forwarding logic 124-126. In one implementation, hardware forwarding tables 121-123 and logic 124-126 are contained in application-specific integrated circuits (ASICs). The ASICs may be designed to provide real time layer 2 packet classification, packet forwarding, and hardware-based MAC address learning.

In one implementation, each hardware forwarding table 121-123 may include entries having individual MAC addresses and corresponding forwarding information. The entries may be learned through hardware-based or software-based learning. Table 1 shown below illustrates an example of forwarding table information that may be included in hardware forwarding tables 121-123.

TABLE 1

Hardware Forwarding Table Information

| Destination MAC Address | VLAN ID | Forwarding Information |
|---|---|---|
| MAC_ADDR_1 | VLAN1 | Port_ID_1 |
| MAC_ADDR_2 | VLAN1 | Port_ID_2 |

In Table 1, individual source MAC addresses and VLAN identifiers extracted from received packets may be stored along with corresponding forwarding information. The MAC addresses are identified in text format as MAC_ADDR_1 and MAC_ADDR_2. The VLAN identification information is illustrated by the VLAN identifier VLAN1. The forwarding information is illustrated in text format as Port_ID_1 and Port_ID_2 for I/O port identifiers. It is understood that in an actual implementation, binary values corresponding to actual MAC addresses and VLAN and port identifiers would be present in this table.

The forwarding information contained in tables 121-123 can be shared via switch fabric 119. For example, forwarding information contained in table 121 can be replicated in tables 122 and 123. A management CPU 128 of MSM 120 can manage tables 121-123 and logic 124-126. For example, management CPU 128 can periodically poll tables 121-123 to extract newly-learned entries and store the entries from all of the forwarding tables in a composite forwarding table 130. In a preferred implementation, only hardware-learned entries are replicated in composite forwarding table 130. Software-learned entries are preferably not replicated in composite forwarding table 130 because management CPU 128 learns these entries and stores them in composite forwarding table 130 when software-based learning is performed.

When software-based learning is required, the packet is forwarded to management CPU 128. Management CPU 128 receives the packet, learns its source address, adds an entry to composite forwarding table 130, programs the entry into the hardware forwarding table. The hardware associated with each forwarding table that receives the entry adds the entry to its forwarding table.

In one implementation, logic 124-126 may be configured to determine whether hardware- or software-based learning will be performed. The determination may be based on the packet classification and/or the port on which the packet was received. Exemplary criteria for classifying packets for hardware- or software-based MAC addresses learning will be described in detail below.

Figure 2:
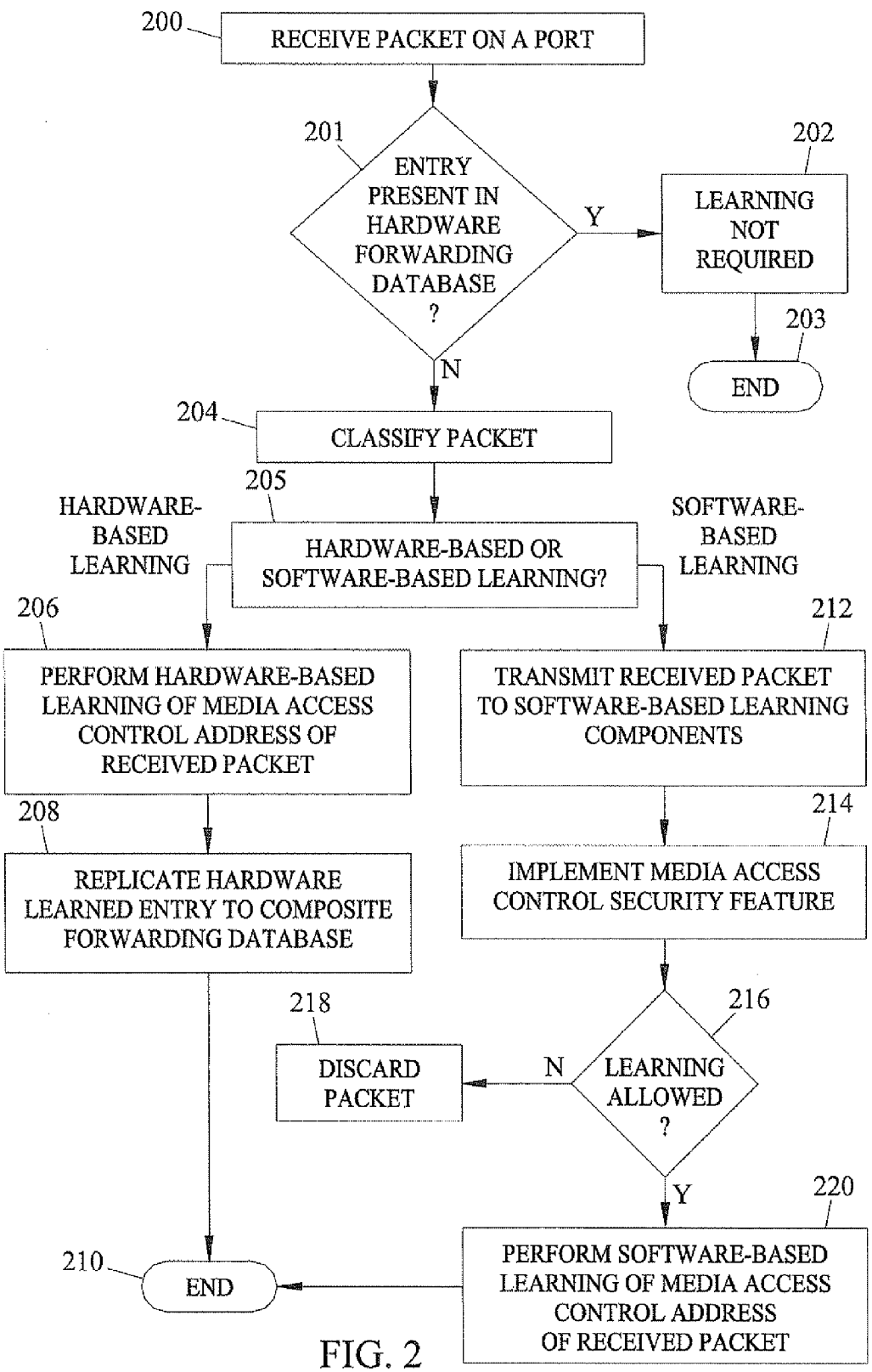
FIG. 2 is a flow chart illustrating an exemplary process implemented by forwarding device shown in FIG. 1 for hybrid hardware- and software-based MAC address learning according to an embodiment of the subject matter described herein.

FIG. 2 is a flow chart illustrating an exemplary process, generally indicated 200, implemented by forwarding device 100 shown in FIG. 1 for hybrid hardware- and software-based MAC address learning according to an embodiment of the subject matter described herein. Referring to FIG. 2, in step 200, a packet may be received on any of ports 104-118. In step 201, the learning and forwarding logic associated with the port on which the packet was received determines whether an entry corresponding to the source MAC address is present in the hardware forwarding database. If an entry is present, learning is not required (step 202) and the learning process ends (step 203). If an entry corresponding to the source address is not present, learning is required. Accordingly, control proceeds to steps 204 and 205 where the packet is classified to determine the type of learning required. Exemplary criteria may be used to classify packets for hardware- or software-based learning includes port, VLAN, and/or source MAC address.

In step 205, if the packet classification is associated with hardware-based MAC address learning, control proceeds to step 206 where hardware-based learning is performed. As discussed above, performing hardware-based learning may include storing source MAC address along with the input port in the hardware forwarding table. In step 208, the hardware-learned entry is replicated to the composite forwarding database. Replicating the hardware-learned entry to the composite forwarding database can include polling the forwarding database from the processor on each I/O module for new entries. When a new entry is detected, the processor may forward the entry to the management CPU. In step 210, the hardware-based MAC learning process ends.

Returning to step 205, if the packet classification is associated with software-based learning, control proceeds to step 212 where the packet is transferred to software-based learning components. In the example illustrated in FIG. 1, the packet may be transmitted to management CPU 128 on MSM 120. In step 214, a MAC security feature is implemented. As described above, MAC security features may include any feature that limits or controls MAC address learning, for example, based on port or VLAN information associated with the received packet. Examples of MAC security features that may be implemented include any of the features described above, such as limiting the number of entries that can be learned on a port and/or VLAN basis, limiting entries that can be learned to an administratively defined list of MAC addresses, or 802.1x security features. In some MAC security implementations, if learning is not permitted for a particular MAC address, the entry will not be added to the MAC forwarding table. In other implementations, MAC addresses that are not allowed to be learned are added to the forwarding table as black hole entries. A black hole entry is an entry that has a MAC address but no forwarding information. If a packet arrives with a MAC source or destination address that matches a black hole entry, the packet will be discarded.

In step 216, management CPU 128 determines whether learning of this particular MAC address is allowed. If learning is not allowed, control may proceed to step 218 where the packet is discarded.

If learning is allowed, control proceeds to step 220 where software-based learning of the MAC address of the received packet is performed. This step may include storing the MAC address and port in composite forwarding table 130 and communicating the address and port information to the appropriate hardware forwarding tables 121-123.

Thus, using the steps illustrated in FIG. 2, hardware- or software-based learning can be selectively performed based on a classification of a received packet. Such flexibility allows security features to be implemented on ports where such features are needed. On other ports where such features are not needed, hardware-based learning may be implemented in order to conserve CPU cycles and decrease packet forwarding delays.

Figure 3:
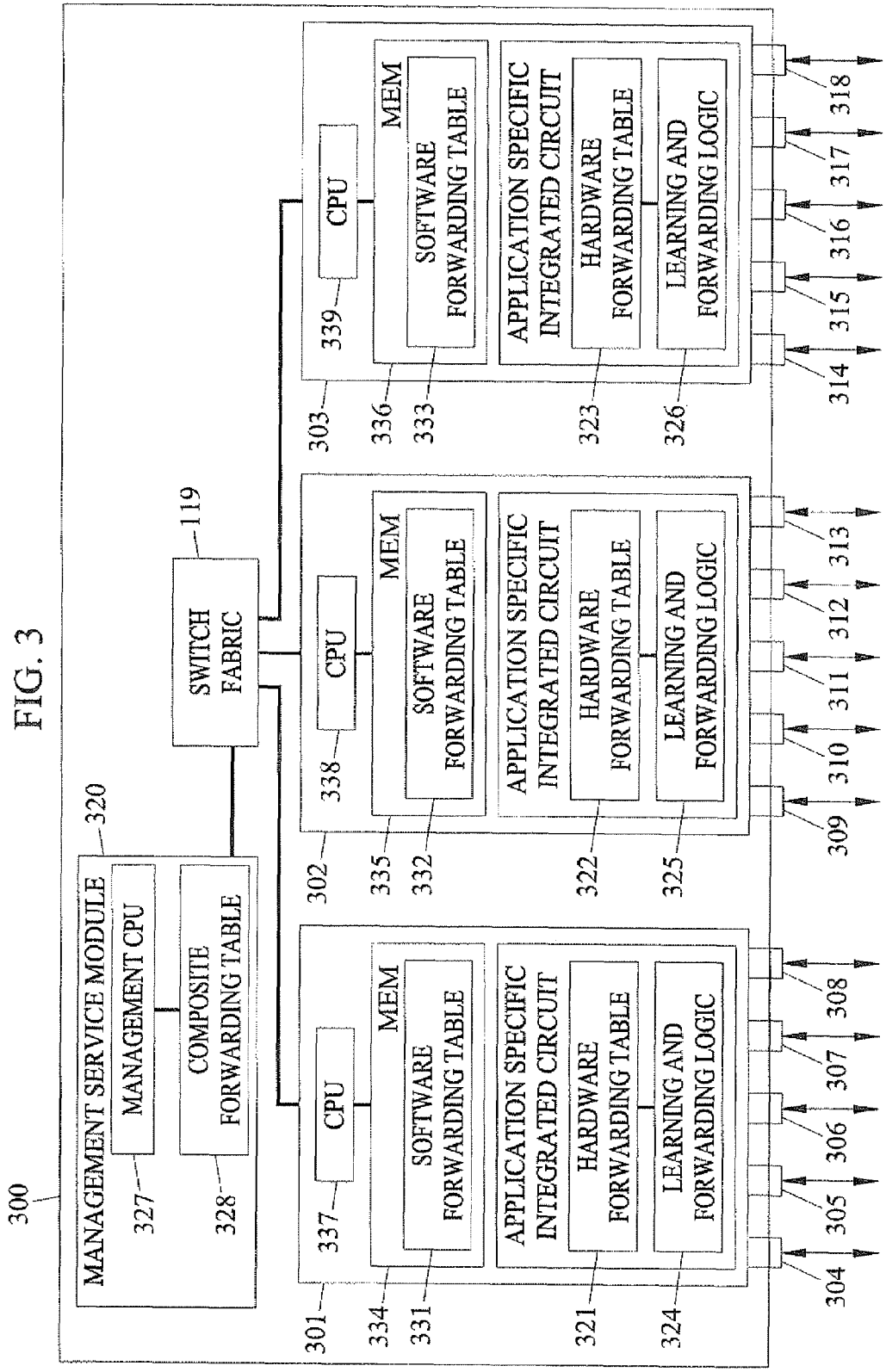
FIG. 3 is a block diagram of exemplary components of an alternate implementation of layer 2 forwarding device for implementing hybrid hardware- and software-based MAC address learning according to another embodiment of the subject matter described herein.

FIG. 3 illustrates exemplary components of another layer 2 forwarding device 300 for implementing hybrid hardware- and software-based MAC address learning according to another embodiment of the subject matter described herein. The primary difference between the architecture illustrated in FIG. 3 and that illustrated in FIG. 1 is that in FIG. 3 each I/O module includes its own processor that maintains a local software copy of its hardware forwarding table. In FIG. 1, each I/O module included only a hardware forwarding table.

Referring to FIG. 3, forwarding device 300 may include hardware and software for forwarding MAC frames intended destinations. For example, forwarding device 300 can include a plurality of input/output modules 301-303 having ports 304-318 for sending and receiving layer 2 packets over a network. A switch fabric 304 connects input/output modules 301-303 to each other and to MSM 320.

Forwarding device 300 also includes hardware and software for implementing hybrid hardware- and software-based MAC address learning. Hardware-based learning can be implemented by learning and forwarding logic 324-326. Hardware forwarding tables 321-323 may include individual MAC addresses and corresponding forwarding information as shown, for example, in Table 1 above. The forwarding information contained in tables 321-323 can be shared with other modules.

In performing hardware-based learning, learning and forwarding logic 324-326 receives a packet and examines its source MAC address. If the MAC address is not contained in the local hardware forwarding table, the learning and forwarding logic adds an entry to the hardware forwarding table. In software-based MAC address learning, if an entry is not present in the hardware forwarding table on the module where a packet is received, the packet is forwarded to management CPU 327. Management CPU 327 may apply a security policy and determine whether MAC address learning is allowed for the received packet. If MAC address learning is allowed, management CPU 327 forwards instructions to the CPU on the module that received the packet instructing the CPU to update the corresponding entry in its hardware forwarding table. Management CPU 327 may also update composite forwarding table 328 with software-learned entries.

In the example illustrated in FIG. 3, input/output modules 301-303 maintain local software copies 331-333 of hardware forwarding tables 321-323 in memories 334-336. CPUs 337-339 distribute the forwarding information contained in tables 321-323 to MSM 320. For example, each CPU 337-339 may continuously send portions of forwarding information in corresponding tables 321-323 to its corresponding memory 334-336. When each CPU 337-339 detects a change to an entry in its respective software forwarding table, the CPU preferably sends a change notification to management CPU 327 so that management CPU 327 can update composite forwarding table 337. Multiple change notifications may be sent in a single message for efficiency purposes.

In order to avoid unnecessary updates being sent to management CPU 337 for software learned entries that were learned by management CPU 327, a mechanism preferably exists by which CPUs 337-339 can distinguish between software and hardware learned entries in software forwarding tables 331-333. Since software learned entries were learned by management CPU 327, these entries are preferably not sent to management CPU 327 a second time. Hardware-learned entries are preferably sent to management CPU 327 so that it can update composite forwarding table 328. In one exemplary implementation, each entry in software forwarding tables 331-333 may include an identifier that indicates whether the entry was software-learned or hardware-learned. Based on this identifier, CPUs 337-339 may determine whether or not to forward the entry to management CPU 337.

According to another important aspect of the invention, software-learned entries may be given priority over hardware-learned entries when space in a forwarding table, forwarding table hash bucket, or other data structure is limited. One reason for giving priority to software-learned entries is that there is a greater penalty for relearning software-learned entries than hardware-learned entries. For example, re-learning a software-learned entry results in a CPU hit and causes packets received for the un-learned entry to be flooded on all output ports. The hardware-learned entries can be re-learned quickly in hardware, minimizing unnecessary flooding. Accordingly, software-learned entries are preferably given priority over hardware-learned entries when forwarding table space is limited.

Figure 4:
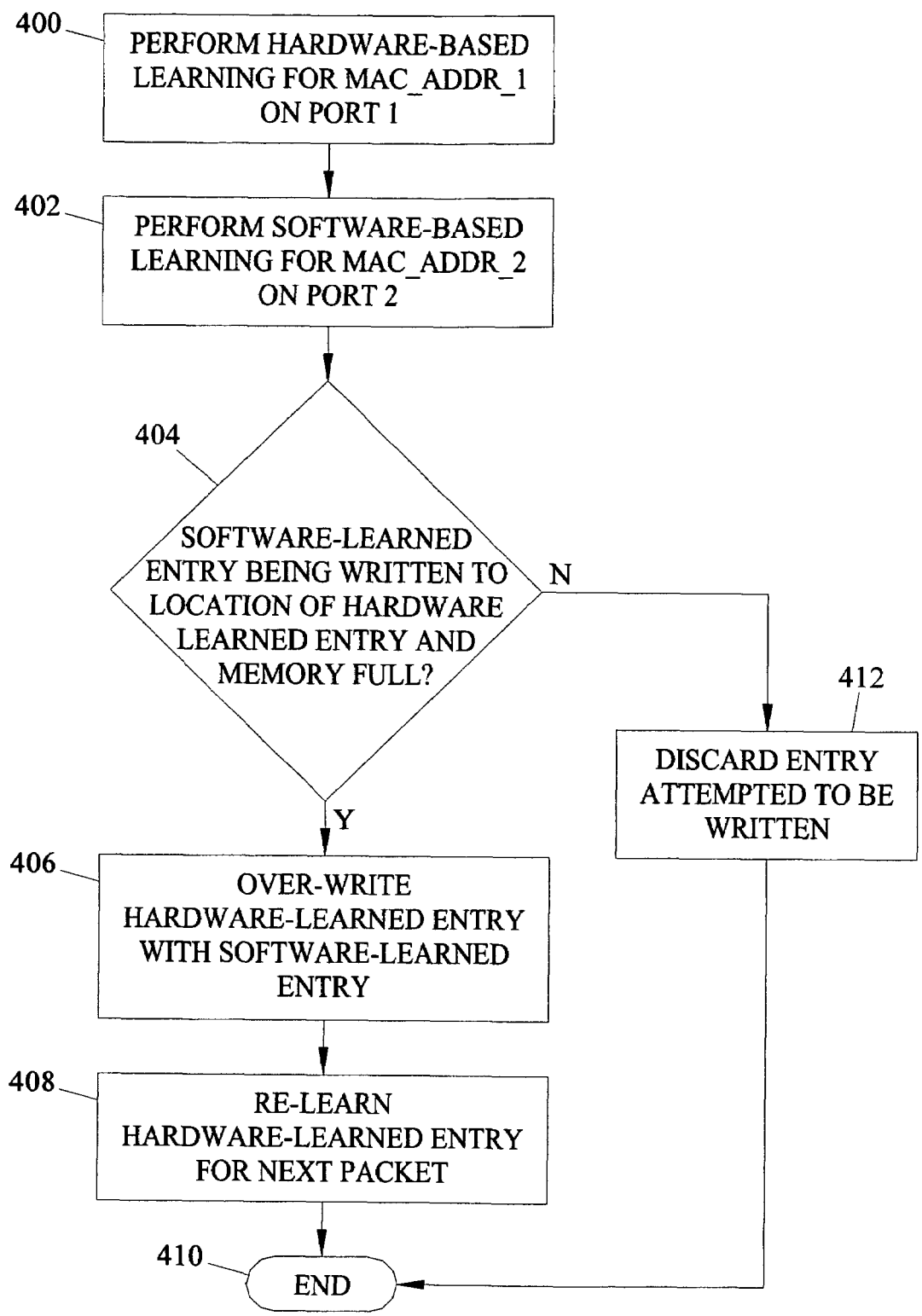
FIG. 4 is a flow chart illustrating exemplary steps for giving preference to software-learned entries over hardware-learned entries when MAC forwarding table space is limited according to an embodiment of the subject matter described herein.

FIG. 4 is a flow chart illustrating exemplary steps that may be performed in giving priority to software-learned entries when two entries are attempted to be written into the same location in a forwarding table. Referring to FIG. 4, in step 400, hardware-based learning is performed for MAC address 1 on port 1. As discussed above, performing hardware-based learning may include storing MAC source address and port information in the hardware forwarding table. In step 402, software-based learning is performed for MAC address 2 on port 2. As described above, software-based learning may include sending the received packet to the managing CPU, storing the MAC source address and port information, and returning the information to the hardware forwarding table where it is written.

In step 404, it is determined whether the software-learned entry is being written to the same location as the hardware-learned entry and the memory that stores the forwarding table is full. The entries may be identified as hardware-learned or software-learned by a predetermined bit that is associated with the entries when they are learned. If a software-learned entry is attempted to be written to the location of a hardware-learned entry and the memory is full, control proceeds to step 406 where the software-learned entry is written over the hardware-learned entry. As described above, this is desirable because there is a greater penalty for re-learning software-learned entries than hardware-learned entries. In step 408, the hardware-learned entry may be re-learned for the next received packet. In step 410, the learning process ends.

In step 404, if it is determined that a software-learned entry is not being written over a hardware-learned entry and the memory is full, the entry attempted to be written is discarded (step 412). This may occur if a software-learned entry is attempted to be written over another software-learned entry, a hardware-learned entry is attempted to be written over another hardware-learned entry, or a hardware-learned entry is attempted to be written over a software-learned entry. In any of these cases, if there is no space left in the memory used to store the forwarding table, existing entries remain in the table until they age out. Thus, using the steps illustrated in FIG. 4, software-learned entries may be given priority over hardware-learned entries when forwarding table space is constrained.

Figure 5:
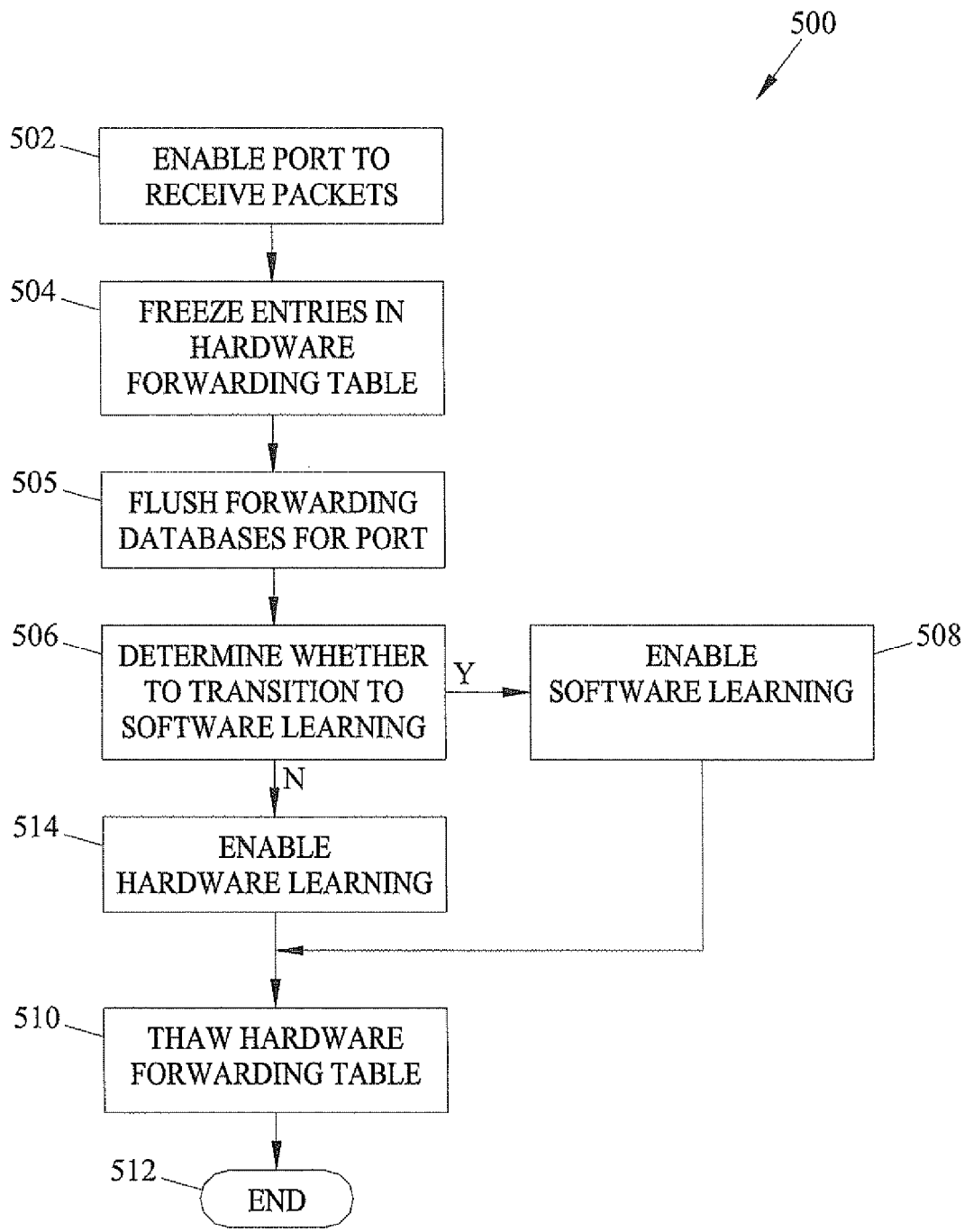
FIG. 5 is a flow chart illustrating exemplary steps for transitioning between software-learning and hardware-learning modes on a per-port basis according to an embodiment of the subject matter described herein.

According to another important aspect of the invention, when hardware-based MAC address learning or software-based MAC address learning is enabled on a per port basis, it may be desirable to switch a port from one mode of operation to another mode of operation. For example, a port may be initially operating in hardware learning mode. When a new MAC security feature is enabled, it may be desirable to transition the port to software learning mode. When this occurs, steps must be taken to ensure that entries in the forwarding table are associated with the new mode. FIG. 5 is a flow chart illustrating exemplary steps for transitioning a port from software learning mode to hardware learning mode according to an embodiment of the present invention. Referring to FIG. 5, in step 502, the port is enabled to receive packets. In step 504, the hardware forwarding table associated with the port is disabled from learning. In step 505, the forwarding databases associated with the port are flushed. The reason for flushing the databases is to delete entries that were learned under the previous learning mode.

In step 506, it is determined whether to transition to software learning. If it is desirable to transition to software learning, control proceeds to step 508 where software learning is enabled. In step 510, the hardware forwarding table is thawed, i.e., entries are allowed to be written to the hardware forwarding table. In step 512, the process ends.

Returning to step 506, if it is determined that the table should remain in hardware learning mode, control proceeds to step 514 where hardware-learning mode is enabled. The table is then thawed and the process ends.

Thus, the present invention includes methods and systems for hybrid hardware- and software-based MAC address learning. In one implementation, ports in a packet forwarding device can be enabled for hardware-based learning or software-based learning. In an alternate implementation, the mode of learning may be selected on a per packet basis based on classification of the packet. Providing both hardware- and software-based learning and a mechanism for flexibly functioning in either mode allows layer 2 features to be flexibly associated with packets or ports.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for layer 2 address learning in a forwarding device, the method comprising:
   (a) receiving a packet including a layer 2 source address at a forwarding device having software and hardware for learning the source address and forwarding information associated with the packet;
   (b) at the forwarding device, classifying the packet and determining whether to implement software-based learning based on a classification determined for the packet;

(c) at the forwarding device, in response to determining to implement software-based learning, utilizing the software of the forwarding device for learning the source address of the received packet and the forwarding information associated with the packet using a software routine executed on a processor of the forwarding device; and, otherwise, (d) at the forwarding device, utilizing the hardware of the forwarding device for learning the source address of the received packet and the forwarding information associated with the packet using learning operations implemented in hardware logic of the forwarding device.

2. The method of claim 1 wherein the layer 2 source address includes a media access control (MAC) source address.

3. The method of claim 1 wherein the forwarding information includes a port on which the packet was received.

4. The method of claim 1 wherein determining whether to implement software-based learning based on the classification includes determining whether to implement software-based learning based on a port on which the packet was received.

5. The method of claim 1 wherein determining whether to implement software-based learning based on the classification includes determining whether to implement software-based learning based on a virtual local area network (VLAN) associated with the received packet.

6. The method of claim 1 wherein utilizing the software of the forwarding device for learning the source address of the received packet includes:
(a) receiving the packet at an Input/Output (I/O) module;
(b) forwarding the packet to a management processor; and
(c) performing the software-based learning at the management processor.

7. The method of claim 1 wherein performing hardware-based learning includes receiving the packet at a hardware device located on an Input/Output (I/O) module and learning the source address of the received packet using the hardware device on the I/O module.

8. The method of claim 1 comprising, in response to determining to implement software-based learning, applying a layer 2 security policy to the received packet.

9. The method of claim 8 wherein utilizing the software of the forwarding device for learning the source address includes learning the source address of the received packet only in response to the received packet passing the security policy.

10. The method of claim 8 wherein applying a layer 2 security policy includes limiting learning of the source address in the received packet based on a predetermined condition.

11. The method of claim 10 wherein the predetermined condition includes at least one of a source port and source Virtual Local Area Network (VLAN) associated with the received packet.

12. The method of claim 10 wherein the predetermined condition includes the presence of the source address in an administratively defined table.

13. The method of claim 8 wherein applying a layer 2 security policy includes implementing an 802.1x security policy.

14. The method of claim 1 wherein utilizing the software of the forwarding device for learning the source address includes writing the source address to a hardware forwarding table.

15. The method of claim 14 wherein writing the source address to the hardware forwarding table includes overwriting a hardware-learned entry in the forwarding table with the source address and forwarding information associated with the received packet.

16. A layer 2 switch for implementing hybrid hardware- and software-based layer 2 address learning, the layer 2 switch comprising:
(a) a forwarding table in the layer 2 switch for storing layer 2 forwarding addresses and corresponding forwarding information;
(b) learning and forwarding logic in the layer 2 switch for performing hardware-based layer 2 address learning and updating the forwarding table with hardware-learned layer 2 addresses; and
(c) a processor in the layer 2 switch for performing software-based learning of layer 2 addresses by executing a software routine on the processor, wherein performing software-based learning includes classifying a received packet and determining whether to implement software-based layer 2 address learning for the received packet based on the classification determined for the received packet.

17. The layer 2 switch of claim 16 wherein the learning and forwarding logic classifies the received packet based on a port on which the packet was received.

18. The layer 2 switch of claim 16 wherein the learning and forwarding logic classifies the received packet based on a virtual local area network (VLAN) associated with the received packet.

19. The layer 2 switch of claim 16 wherein, in response to determining that software-based learning is required, the learning and forwarding logic forwards the packet to the processor and wherein the processor extracts the layer 2 source address from the packet.

20. The layer 2 switch of claim 16 wherein performing hardware-based layer 2 address learning includes using the learning and forwarding logic to learn the source address in the received packet and writes the source address to the hardware forwarding table.

21. The layer 2 switch of claim 16 wherein, in response to determining that software-based learning is required, the learning and forwarding logic forwards the packet to the processor, and wherein the processor applies a layer 2 security policy to the packet.

22. The layer 2 switch of claim 21 wherein the processor is performs the software-based learning only in response to determining that the packet passes the security policy.

23. The layer 2 switch of claim 21 wherein the security policy comprises a policy that limits learning of MAC addresses based on at least one of a port and Virtual Local Area Network (VLAN) basis.

24. The layer 2 switch of claim 21 wherein the layer 2 security policy comprises a policy that limits learning of MAC addresses based on an administratively defined table of MAC addresses.

25. The layer 2 switch of claim 21 wherein the layer 2 security policy comprises an 802.1x policy.

26. The layer 2 switch of claim 16 wherein, in response to determining that software-based learning is required, the processor writes the source address of the packet to the hardware forwarding table.

27. The layer 2 switch of claim 26 wherein the processor overwrites a hardware-learned entry in the hardware forwarding table.

28. A computer-readable medium encoded with computer-executable instructions for performing steps comprising:

(a) receiving a packet including a layer 2 source address at a forwarding device having software and hardware for learning the source address and forwarding information associated with the packet;

(b) at the forwarding device, classifying the packet and determining whether to implement software-based learning based on a classification determined for the packet;

(c) at the forwarding device, in response to determining to implement software-based learning, utilizing the software of the forwarding device for learning the source address of the received packet and the forwarding information associated with the packet using a software routine executed on a processor of the forwarding device; and, otherwise, (d) at the forwarding device, in response to determining to implement hardware-based learning, utilizing the hardware of the forwarding device for learning the source address of the received packet and the forwarding information associated with the packet using learning operations implemented in hardware logic of the forwarding device.

29. The computer-readable medium of claim 28 wherein the layer 2 source address includes a media access control (MAC) source address.

30. The computer program product of claim 28 wherein the forwarding information includes a port on which the packet was received.

31. The computer-readable medium of claim 28 wherein determining whether to implement software-based learning based on the classification includes determining whether to implement software-based learning based on a port on which the packet was received.

32. The computer-readable medium of claim 28 wherein determining whether to implement software-based learning based on the classification includes determining whether to implement software-based learning based on a virtual local area network (VLAN) associated with the received packet.

33. The computer-readable medium of claim 28 wherein utilizing the software of the forwarding device for learning the source address of the received packet includes:

(a) receiving the packet at an Input/Output (I/O) module;

(b) forwarding the packet to a management processor; and (c) performing the software-based learning at the management processor.

34. The computer-readable medium of claim 28 wherein performing hardware-based learning includes receiving the packet at a hardware device located on an Input/Output (I/O) module and learning the source address of the received packet using the hardware device on the I/O module.

35. The computer-readable medium of claim 28 comprising, in response to determining to implement software-based learning, applying a layer 2 security policy to the received packet.

36. The computer-readable medium of claim 35 wherein utilizing the software of the forwarding device for learning the source address includes learning the source address of the received packet only in response to the received packet passing the security policy.

37. The computer-readable medium of claim 35 wherein applying a layer 2 security policy includes limiting learning of the source address in the received packet based on a predetermined condition.

38. The computer-readable medium of claim 37 wherein the predetermined condition includes at least one of a source port and source VLAN associated with the received packet.

39. The computer-readable medium of claim 37 wherein the predetermined condition includes the presence of the source address in an administratively defined table.

40. The computer-readable medium of claim 35 wherein applying a layer 2 security policy includes implementing an 802.1x security policy.

41. The computer-readable medium of claim 28 wherein utilizing the software of the forwarding device for learning the source address includes writing the source address to a hardware forwarding table.

42. The computer-readable medium of claim 41 wherein writing the source address to the hardware forwarding table includes overwriting a hardware-learned entry in the forwarding table with the source address and forwarding information associated with the received packet.

* * * * *

UNITED STATES PATENT AND TRADEMARK OFFICE
CERTIFICATE OF CORRECTION

PATENT NO. : 7,660,259 B1 Page 1 of 1
APPLICATION NO. : 10/969678
DATED : February 9, 2010
INVENTOR(S) : Grosser et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 804 days.

Signed and Sealed this

Thirtieth Day of November, 2010

David J. Kappos
*Director of the United States Patent and Trademark Office*